(No Model.)
S. FISHER.
BRIDLE BIT.
No. 398,319. Patented Feb. 19, 1889.
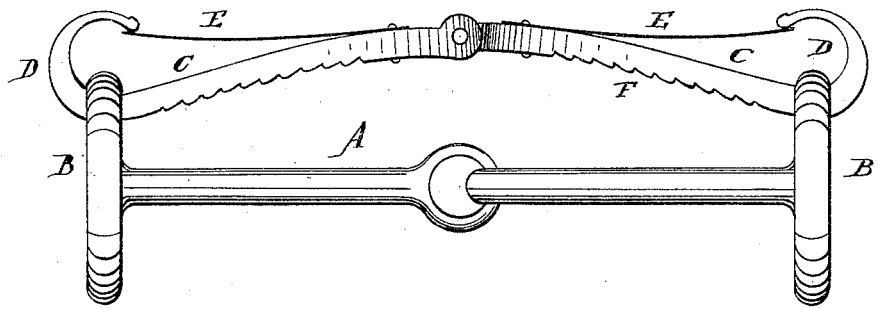
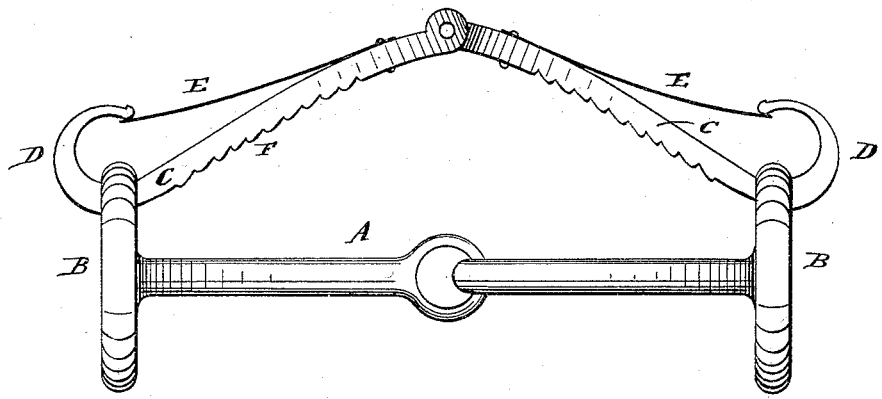
WITNESSES:
Henry Huber
Carl Kay
INVENTOR.
Samuel Fisher
BY
Gorner & Raegener
ATTORNEYS.

UNITED STATES PATENT OFFICE.

SAMUEL FISHER, OF MOUNT WASHINGTON, MARYLAND, ASSIGNOR OF ONE-HALF TO WILLIAM JAMES CAUTHERS, OF FORDHAM, NEW YORK.

BRIDLE-BIT.

SPECIFICATION forming part of Letters Patent No. 398,319, dated February 19, 1889.

Application filed October 20, 1888. Serial No. 288,663. (No model.)

*To all whom it may concern:*

Be it known that I, SAMUEL FISHER, of Mount Washington, county of Baltimore, State of Maryland, have invented certain new and useful Improvements in Attachments for Bridle-Bits, of which the following is a specification.

This invention relates to improvements in bridle-bits, especially to that class of bits known as "snaffle" and "elastic" bits.

The object of my invention is to provide a new and improved attachment for bridle-bits by means of which the horse can at all times be kept under perfect control and thoroughly mastered.

The invention consists of two bars hinged together at their meeting inner ends and provided at their outer ends with means for connecting them with the end rings of the bit.

In the accompanying drawings, Figure 1 is a side view of a snaffle-bit provided with my improved attachment, the same being in the normal position. Fig. 2 is a similar view showing the middle portion raised.

Similar letters of reference indicate corresponding parts.

The snaffle-bit A, which may be of any well-known construction, is provided at the ends with the usual rings, B. The two bars or rods C are hinged to each other at their inner meeting ends in such a manner that said hinged inner ends can swing upward. The outer ends of the bars C terminate in hooks D, which can be passed through the rings B. Springs E are secured on the bars C, and rest against the ends of the hooks D for the purpose of keeping the hooks engaged with the rings. The under sides or edges of the bars C are provided with serrations F, which, however, are not made so sharp as to lacerate the animal.

The bridle-bit with my attachment is placed in the horse's mouth in the usual manner. When the reins are pulled very hard, the rings B are moved toward each other and toward the back of the animal's mouth, and thereby the hinged bars C are raised at the hinge and pressed against the top of the horse's mouth. The serrated bottom edges of the bars press on the horse's tongue, and thus assist in controlling the animal.

The attachment is shorter than the bridle-bit, and the horse can never move the same toward the front of the mouth sufficiently to grasp it between the teeth.

In case the horse does get the bridle-bit between his teeth and the reins are pulled the hinged part of the attachment is moved upward, and, pressing on the top of the animal's mouth, causes the horse to open its mouth and release the bridle-bit.

Having thus described my invention, I claim as new and desire to secure by Letters Patent—

The combination, with a bridle-bit composed of two end rings, and links pivoted on said end rings and to each other, of two rods or bars having serrations, and hinged to each other at the meeting ends and having snap-hooks on their outer ends, which snap-hooks engage the end rings of the bit, substantially as set forth.

In testimony that I claim the foregoing as my invention I have signed my name in presence of two subscribing witnesses.

SAMUEL FISHER.

Witnesses:
JOHN G. BREESE,
WM. DONOHUE.